(12) United States Patent
Zhang

(10) Patent No.: US 10,429,574 B2
(45) Date of Patent: Oct. 1, 2019

(54) LIQUID CRYSTAL DISPLAY AND BACKLIGHT MODULE THEREOF

(71) Applicant: WUHAN CHINA STAR OPTOELECTRONICS TECHNOLOGY CO., LTD, Wuhan, Hubei (CN)

(72) Inventor: Zhenzhen Zhang, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/569,821

(22) PCT Filed: Jul. 26, 2017

(86) PCT No.: PCT/CN2017/094530
§ 371 (c)(1),
(2) Date: Oct. 27, 2017

(87) PCT Pub. No.: WO2019/000536
PCT Pub. Date: Jan. 3, 2019

(65) Prior Publication Data
US 2019/0004240 A1    Jan. 3, 2019

(30) Foreign Application Priority Data

Jun. 30, 2017   (CN) .......................... 2017 1 0522527

(51) Int. Cl.
*F21V 21/00*    (2006.01)
*F21V 8/00*    (2006.01)

(52) U.S. Cl.
CPC ......... *G02B 6/0085* (2013.01); *G02B 6/0055* (2013.01); *G02B 6/0073* (2013.01); *G02B 6/0088* (2013.01)

(58) Field of Classification Search
CPC ..... G02B 6/0068; G02B 6/0085; G02B 6/009
(Continued)

(56) References Cited

U.S. PATENT DOCUMENTS

2005/0185113 A1*   8/2005   Weindorf ............. G02B 6/0023
349/71
2009/0128732 A1    5/2009   Hamada
(Continued)

FOREIGN PATENT DOCUMENTS

CN    1434335 A    8/2003
CN    1851544 A    10/2006
(Continued)

*Primary Examiner* — Laura K Tso
(74) *Attorney, Agent, or Firm* — Mintz Levin Cohn Ferris Glovsky and Popeo, P.C.; Kongsik Kim; Jhongwoo Jay Peck

(57) ABSTRACT

The present disclosure provides a liquid crystal display and a backlight module thereof. The backlight module includes a light guide plate, a reflective layer, an optical film assembly and a light-emitting assembly. The optical film assembly is disposed on a top of the light guide plate, the reflective layer is disposed on a bottom of the light guide plate, the light-emitting assembly includes an LED light bar disposed opposite a light incident surface of the light guide plate and a substrate disposed on a bottom of the LED light bar, and the substrate extends to a bottom of the reflective layer. The present disclosure enlarges the assembly space of the substrate by disposing the substrate on the bottom of the reflective layer and extending the substrate to the bottom of the reflective layer, thereby making it easier to dissipate heat of the LED light bar.

19 Claims, 1 Drawing Sheet

(58) Field of Classification Search
USPC .......................................................... 362/613
See application file for complete search history.

(56) References Cited

U.S. PATENT DOCUMENTS

| | | | | |
|---|---|---|---|---|
| 2014/0301107 A1* | 10/2014 | Mizutani | ............. | G02B 6/0091 |
| | | | | 362/612 |
| 2015/0124177 A1* | 5/2015 | Ikuta | .................. | G02B 6/0085 |
| | | | | 348/790 |
| 2015/0138830 A1* | 5/2015 | Yu | ........................ | F28D 15/043 |
| | | | | 362/609 |
| 2015/0167952 A1* | 6/2015 | Lee | ........................ | F21V 29/70 |
| | | | | 362/612 |
| 2015/0185411 A1* | 7/2015 | Ikuta | .................. | G02B 6/0086 |
| | | | | 348/790 |
| 2015/0268412 A1* | 9/2015 | Lee | ..................... | G02B 6/0091 |
| | | | | 362/613 |
| 2015/0341587 A1* | 11/2015 | Chikazawa | ......... | G02B 6/0091 |
| | | | | 348/725 |

FOREIGN PATENT DOCUMENTS

| | | | |
|---|---|---|---|
| CN | 201066417 | Y | 5/2008 |
| CN | 202361198 | U | 8/2012 |
| CN | 102954407 | A | 3/2013 |
| CN | 103727467 | A | 4/2014 |
| CN | 104279465 | A | 1/2015 |
| CN | 204459973 | U | 7/2015 |
| CN | 106801823 | A | 6/2017 |
| JP | 09-138399 | A | 5/1997 |

\* cited by examiner

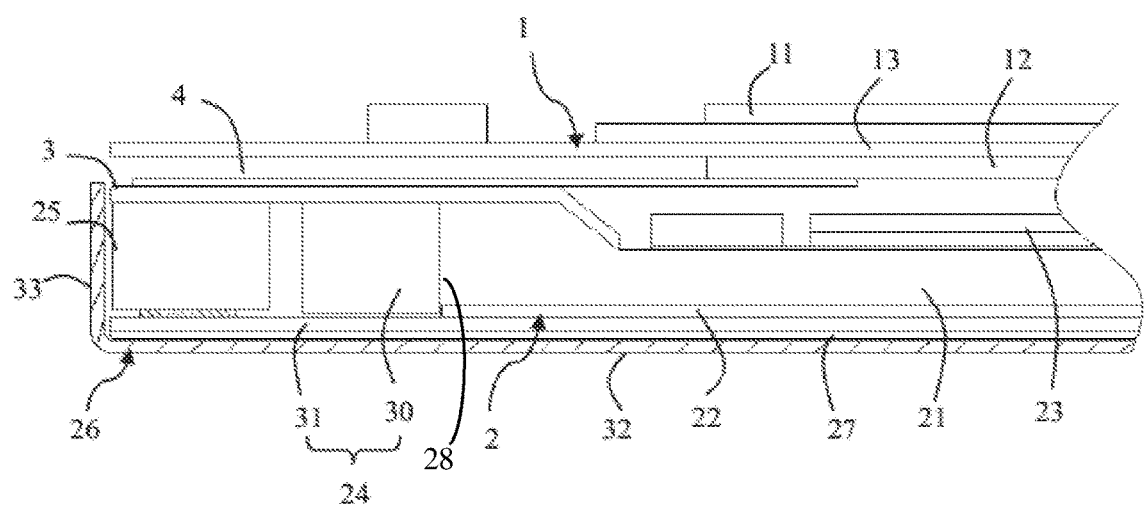

LIQUID CRYSTAL DISPLAY AND BACKLIGHT MODULE THEREOF

CROSS-REFERENCES TO RELATED APPLICATIONS

This application is a U.S. national phase application, pursuant to 35 U.S.C. § 371, of PCT/CN2017/094530, filed Jul. 26, 2017, designating the United States, which claims priority to Chinese Application No. 201710522527.4, filed Jun. 30, 2017. The entire contents of the aforementioned patent applications are incorporated herein by this reference.

BACKGROUND OF THE INVENTION

Field of the Invention

The present disclosure relates to the liquid crystal display technical field, especially relates to a liquid crystal display and a backlight module thereof.

Discussion of the Related Art

The liquid crystal display has advantages of a thin body, low power consumption and radiationless etc., thus it has been more and more widely used. The liquid crystal display belongs to a passive light emitting display, and a backlight source is required to provide a light source for the liquid crystal display, wherein the backlight source includes an LED light bar which may produce heat during luminescence, but an assembly space reserved for the backlight source in the liquid crystal display is limited, thus the heat produced by the LED light bar cannot be dissipated in time, therefore the service life of the LED light bar is reduced. In addition, other components in the liquid crystal display may also deform due to the heat, thereby affecting the performance and lifetime of the liquid crystal display.

SUMMARY OF THE INVENTION

To solve the above problem, the present disclosure provides a liquid crystal display and a backlight module thereof, which can improve a heat radiation effect of the LED light bar, prolongs the service life of the LED light bar and the liquid crystal display, and promotes the performance of the liquid crystal display.

The specific technical solutions proposed by the present disclosure are as follows: there is provides a backlight module, which includes a light guide plate, a reflective layer, an optical film assembly and a light-emitting assembly. The optical film assembly is disposed on a top of the light guide plate, the reflective layer is disposed on a bottom of the light guide plate, the light-emitting assembly includes an LED light bar disposed opposite a light incident surface of the light guide plate and a substrate disposed on a bottom of the LED light bar, and the substrate extends to a bottom of the reflective layer.

Alternatively, the backlight module also includes a plastic frame disposed opposite the light incident surface of the light guide plate, and the LED light bar is disposed between the plastic frame and the light guide plate.

Alternatively, the substrate further extends to a bottom of the plastic frame.

Alternatively, the backlight module also includes a backplane which includes a baseboard and an sideboard bent and extending from the baseboard, and the baseboard is located on a bottom of the substrate, and the sideboard is located at a side of the LED light bar facing away from the light incident surface of the light guide plate.

Alternatively, the reflective layer is a reflective sheet.

Alternatively, the reflective layer is a reflective coating that is coated on the top of the substrate.

Alternatively, the substrate is a single plate.

Alternatively, the backlight module also includes a heat dissipating sheet disposed on the bottom of the substrate.

The present disclosure also provides a liquid crystal display which includes the abovementioned backlight module and a display module disposed on the backlight module.

Alternatively, the liquid crystal display also includes a light blocking adhesive layer which covers the LED light bar and extends to the top of the light guide plate.

The backlight module provided in the present disclosure includes a light guide plate, a reflective layer, an optical film assembly and a light-emitting assembly, the light-emitting assembly includes an LED light bar disposed opposite a light incident surface of the light guide plate and a substrate disposed on a bottom of the LED light bar, and the substrate extends to a bottom of the reflective layer. The present disclosure enlarges the assembly space of the substrate by disposing the substrate on the bottom of the reflective layer and extending the substrate to the bottom of the reflective layer, thus the substrate can be made with larger size, thereby making it easier to dissipate heat of the LED light bar, which prolongs the service life of the LED light bar and the liquid crystal display and promotes the performance of the liquid crystal display.

BRIEF DESCRIPTION OF THE DRAWINGS

FIG. 1 is a structural diagram of a liquid crystal display.

DETAILED DESCRIPTION OF EXEMPLARY EMBODIMENTS

Embodiments of the present disclosure will be described in detail below by referring to the accompany drawings. However, the present disclosure can be approached in numerous different forms, and the present disclosure may not be explained to be limited hereto. Instead, these embodiments are provided for explaining the principle and actual application of the present invention, thus other skilled in the art can understand various embodiments and amendments which are suitable for specific intended applications of the present invention.

Referring to FIG. 1, the liquid crystal display provided in the present embodiment includes a display module 1 and a backlight module 2. The display module 1 is disposed on the backlight module 2, and the backlight module 2 is used to provide a light source for the display module 1. The backlight module 2 includes a light guide plate 21, a reflective layer 22, an optical film assembly 23 and a light-emitting assembly 24. The optical film assembly 23 is disposed on a top of the light guide plate 21, the reflective layer 22 is disposed on a bottom of the light guide plate 21, the light-emitting assembly 24 includes an LED light bar 30 disposed opposite a light incident surface 28 of the light guide plate 21 and a substrate 31 disposed on a bottom of the LED light bar 30, and the substrate 31 extends to a bottom of the reflective layer 22.

In the present embodiment, the backlight module 2 is an side-emitting type backlight module, the LED light bar 30 is disposed to surround the light guide plate 21, light emitted from the LED light bar 30 enters into the light guide plate 21 from a side surface of the light guide plate 21, that is, the side surface of the light guide plate 21 is a light incident surface 28, and light exits from the top of the light guide plate after being repeatedly reflected in the light guide plate 21 and then enters into the display module 1 after passing by the optical film assembly 23, wherein the reflective layer 22 is used to reflect the light that is incident on the bottom of the light guide plate 21, so as to prevent the light from exiting from the bottom of the light guide plate 21. The reflective layer 22 may be a reflective sheet, and in the present embodiment, the reflective layer 22 may also be a reflective coating which is coated on a top of the substrate 31, and it is possible to reduce a thickness of the whole backlight module 2 by coating the reflective coating to replace the reflective sheet on the top of the substrate 31.

The substrate 31 is disposed on the bottom of the LED light bar 30 and extends to the bottom of the reflective layer 22, and it is preferred that the LED light bar 30 covers the bottom of the whole reflective layer 22. The larger size the substrate 31 has, the better heat radiation effect for the LED light bar is achieved, which prolongs the service life of the LED light bar 30 and the liquid crystal display, and promotes the performance of the liquid crystal display.

In order to enhance a stability of the whole backlight module 2, the backlight module 2 also includes a plastic frame 25 which is disposed opposite the light incident surface 28 of the light guide plate 21, the plastic frame 25 is disposed to surround an edge of the light guide plate, and the LED light bar 30 is disposed between the plastic frame 25 and the light guide plate 21. The substrate 31 in the present embodiment is an FPC, and also extends to the bottom of the plastic frame 25 which is bonded with the substrate 31 by a double-side adhesive tape. An area of the whole substrate 31 is substantially equivalent to an area of the bottom of the whole backlight module 2, which enhances the heat radiation effect of the LED light bars selectively.

In addition, due to an increase of the size of the substrate 31, a line layout area of the LED bar 30 is enlarged, and the substrate 31 may be a single plate and can be made to be thinner in thickness, which further reduces the thickness of the whole backlight module 2.

In the present embodiment, the backlight module 2 also includes a backplane 26 which includes a baseboard 32 and an sideboard 33 bent and extending from the baseboard 32, and the baseboard 32 is located on a bottom of the substrate 31, and the sideboard 33 is located at a side of the LED light bar 30 facing away from the light incident surface 23 of the light guide plate 21. The plastic frame 25 is disposed between the sideboard 33 and the LED light bar 30. The substrate 31 extends to a joint of the sideboard 33 and the baseboard 32 and completely covers a surface of the baseboard 32.

To further enhance the heat radiation effect of the LED light bar 30, the backlight module 2 in the present embodiment also includes a heat dissipating sheet 27 disposed on the bottom of the substrate 31. The heat dissipating sheet 27 is disposed between the baseboard 32 and the substrate 31 and completely covers the bottom of the substrate 31. The heat dissipating sheet 27 is a graphite sheet.

The display module 1 includes an upper polarizer 11, a lower polarizer 12 and a display assembly 13 disposed therebetween. The lower polarizer 12 is located above the optical film assembly 23. The liquid crystal display in the present embodiment also includes a light blocking adhesive layer 3 disposed on the top of the LED bar 30, and the light blocking adhesive layer 3 covers the LED light bar 30 and respectively extends to the top of the light guide plate 21 and the top of the plastic frame 25. The light blocking adhesive layer 3 may be an opaque adhesive layer or a graphite sheet and can prevent light leakage of the backlight module 2 and perform heat dissipation for the backlight module 2. The liquid crystal display also includes an adhesive layer 4 disposed between the light blocking adhesive layer 3 and the display module 1, an end of the adhesive layer 4 is attached to the light blocking adhesive layer 3, and another end thereof is extended and attached to a bottom of the lower polarizer 12. Thus, the light blocking adhesive layer 3 can also be used to support the display module 1.

The above statements are only the specific embodiments of the present application, it should be pointed out that, to those ordinary skilled in the art, several improvements and polish can be made without departing from the principle of the present application, also those improvements and polish should be considered as the protection scope of the present application.

What is claimed is:

1. A backlight module, comprising:
   a light guide plate;
   a reflective layer disposed on a bottom of the light guide plate;
   an optical film assembly disposed on a top of the light guide plate;
   a light-emitting assembly comprising an LED light bar disposed opposite a light incident surface of the light guide plate and a substrate disposed on a bottom of the LED light bar, wherein the substrate extends under a bottom surface of the reflective layer; and
   a light blocking adhesive layer disposed on a top of the LED light bar, the light blocking adhesive layer covering the LED light bar and extending to the top of the light guide plate.

2. The backlight module of claim 1, further comprising a plastic frame disposed opposite the light incident surface of the light guide plate, and the LED light bar disposed between the plastic frame and the light guide plate.

3. The backlight module of claim 2, wherein the substrate further extends under a bottom of the plastic frame.

4. The backlight module of claim 1, further comprising a backplane which comprises a baseboard located on a bottom of the substrate and an sideboard bent and extending from the baseboard and located at a side of the LED light bar facing away from the light incident surface of the light guide plate.

5. The backlight module of claim 1, wherein the reflective layer is a reflective sheet.

6. The backlight module of claim 1, wherein the reflective layer is a reflective coating that is coated on a top of the substrate.

7. The backlight module of claim 1, wherein the substrate is a single plate.

8. The backlight module of claim 1, further comprising a heat dissipating sheet disposed on a bottom of the substrate.

9. The backlight module of claim 2, further comprising a heat dissipating sheet disposed on a bottom of the substrate.

10. The backlight module of claim 3, further comprising a heat dissipating sheet disposed on a bottom of the substrate.

11. The backlight module of claim 4, further comprising a heat dissipating sheet disposed on the bottom of the substrate.

12. The backlight module of claim 7, further comprising a heat dissipating sheet disposed on a bottom of the substrate.

13. A liquid crystal display, comprising:
    a backlight module which comprises:

a light guide plate;

a reflective layer disposed on a bottom of the light guide plate;

an optical film assembly disposed on a top of the light guide plate;

a light-emitting assembly comprising an LED light bar disposed opposite a light incident surface of the light guide plate and a substrate disposed on a bottom of the LED light bar, wherein the substrate extends under a bottom surface of the reflective layer; and a light blocking adhesive layer disposed on a top of the LED light bar, the light blocking adhesive layer covering the LED light bar and extending to the top of the light guide plate; and a display module disposed on the backlight module.

14. The liquid crystal display of claim 13, wherein the backlight module further comprises a plastic frame disposed opposite the light incident surface of the light guide plate, and the LED light bar is disposed between the plastic frame and the light guide plate.

15. The liquid crystal display of claim 14, wherein the substrate further extends under a bottom of the plastic frame.

16. The liquid crystal display of claim 13, wherein the backlight module further comprises a backplane which comprises a baseboard located on a bottom of the substrate and an sideboard bent and extending from the baseboard and located at a side of the LED light bar facing away from the light incident surface of the light guide plate.

17. The liquid crystal display of claim 13, wherein the substrate is a single plate.

18. The liquid crystal display of claim 13, further comprising a heat dissipating sheet disposed on a bottom of the substrate.

19. A backlight module, comprising:

a light guide plate;

a reflective layer disposed on a bottom of the light guide plate;

an optical film assembly disposed on a top of the light guide plate;

a light-emitting assembly comprising an LED light bar disposed opposite a light incident surface of the light guide plate and a substrate disposed on a bottom of the LED light bar; and a light blocking adhesive layer disposed on a top of the LED light bar, the light blocking adhesive layer covering the LED light bar and extending to the top of the light guide plate.

\* \* \* \* \*